(12) United States Patent
Carr et al.

(10) Patent No.: US 12,480,480 B2
(45) Date of Patent: Nov. 25, 2025

(54) SHAPE MEMORY ALLOY APPARATUS

(71) Applicant: CAMBRIDGE MECHATRONICS LIMITED, Cambridge (GB)

(72) Inventors: Joshua Carr, Cambridge (GB); Andrew Benjamin Simpson Brown, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 665 days.

(21) Appl. No.: 17/796,849

(22) PCT Filed: Feb. 5, 2021

(86) PCT No.: PCT/EP2021/052840
§ 371 (c)(1),
(2) Date: Aug. 1, 2022

(87) PCT Pub. No.: WO2021/156458
PCT Pub. Date: Aug. 12, 2021

(65) Prior Publication Data
US 2023/0048232 A1    Feb. 16, 2023

(30) Foreign Application Priority Data

Feb. 6, 2020 (GB) ..................... 2001624

(51) Int. Cl.
*F03G 7/06* (2006.01)
*G02B 7/09* (2021.01)
*G02B 27/64* (2006.01)

(52) U.S. Cl.
CPC ......... *F03G 7/06143* (2021.08); *F03G 7/064* (2021.08); *G02B 27/646* (2013.01); *F03G 7/0665* (2021.08); *G02B 7/09* (2013.01)

(58) Field of Classification Search
None
See application file for complete search history.

(56) References Cited

U.S. PATENT DOCUMENTS 11,016,261 B2 * 5/2021 John ................... G02B 7/003
2007/0280668 A1 12/2007 Kubo et al.
(Continued)

FOREIGN PATENT DOCUMENTS

CN    101893748 A    11/2010
CN    101896719 A    11/2010
(Continued)

OTHER PUBLICATIONS

GB Search Report and Examination Report of GB Application 2001624.2 dated Jun. 22, 2020.
(Continued)

*Primary Examiner* — Bernard Rojas
(74) *Attorney, Agent, or Firm* — Van Hoven PC; Stefan D. Osterbur; Joshua Van Hoven (57) ABSTRACT

A shape memory alloy apparatus (1) comprising: a member (3) comprising a first end portion (5) and a second end portion (7); and a shape memory alloy component (9) connected to the member (3). The shape memory alloy component (9) being configured to, on contraction, change the separation between the first end portion (5) and the second end portion (7) of the member (3), the member (3) being configured to be in tension during contraction of the shape memory alloy component (9), wherein the said separation changes in a direction that is angled to the direction of contraction.

18 Claims, 3 Drawing Sheets

(56) References Cited

U.S. PATENT DOCUMENTS

| | | | |
|---|---|---|---|
| 2011/0279916 A1* | 11/2011 | Brown | F03G 7/06143 |
| | | | 359/823 |
| 2015/0346507 A1* | 12/2015 | Howarth | G02B 7/023 |
| | | | 60/527 |
| 2019/0129132 A1 | 5/2019 | Fan et al. | |
| 2020/0362837 A1* | 11/2020 | Bunting | F03G 7/063 |

FOREIGN PATENT DOCUMENTS

| | | |
|---|---|---|
| CN | 102770804 A | 11/2012 |
| CN | 203420842 U | 2/2014 |
| CN | 104204935 A | 12/2014 |
| EP | 1626177 | 2/2006 |
| GB | 2500646 | 10/2013 |
| WO | WO 2010089526 A2 | 8/2010 |
| WO | WO 2013121225 A1 | 8/2013 |
| WO | 2019034860 A1 | 2/2019 |
| WO | WO 2019142005 A1 | 7/2019 |

OTHER PUBLICATIONS

International Search Report and Written Opinion of PCT/EP2021/052840 dated Jul. 22, 2021.

CN first office action and machine translation for application 202180013427.3 dated Apr. 30, 2025, pp. 14.

\* cited by examiner

SHAPE MEMORY ALLOY APPARATUS

CROSS-REFERENCE TO RELATED APPLICATIONS

This application is a national stage application under 35 U.S.C. § 371 of International Application No. PCT/EP2021/052840, filed Feb. 5, 2021, which claims priority of GB Patent Application No. 2001624.2, filed Feb. 6, 2020, the disclosures of each of which are hereby incorporated by reference herein in their entireties.

FIELD

The present invention relates to a shape memory alloy (SMA) apparatus, a method for controlling an SMA apparatus, and a method of manufacturing a shape memory alloy apparatus.

BACKGROUND

The use of SMA components for use as actuators is known, and their use has particular advantages in miniature devices. Such actuators may be used, for example, in miniature cameras for driving movement of the camera lens element along its optical axis for uses such as autofocusing, zoom, and stabilisation.

As an example, PCT application with publication number WO2011/104518 discloses an SMA actuation apparatus for providing Optical Image Stabilisation (OIS) and autofocus (AF). The SMA actuation apparatus uses eight SMA actuator wires to move a moveable element on a support structure, wherein the SMA wires are each arranged inclined with respect to a notional primary axis. More specifically, the SMA wires are arranged with a pair of the SMA wires provided on each of four sides around the primary axis. The SMA wires are connected by crimp members so that on contraction two groups of four SMA actuator wires provides a force with a component in opposite directions along the primary axis, so that the groups are capable of providing movement control for all six degree of freedom.

There are other mechanisms, such as scissor jack arrangements, that can be used in a miniature device to effect motion in a moveable element. However, such arrangement only permits a linear motion in one direction.

SUMMARY

In the SMA apparatus described herein, by placing the members or biasing elements under tension only during contraction of the SMA components prevents buckling of the apparatus, which can occur if the member or biasing element is constantly under tension. Given the long term high frequency use of such actuators in, for example, camera lens arrangements, good buckling resistance is highly beneficial.

In addition, the inventors have appreciated the benefits of being able to increase as well as decrease the separation of two end portions of a member by contraction of SMA components, as opposed to contraction of the SMA component only being able to increase the separation in conventional scissor jack arrangements.

The shape memory alloy actuation apparatus may be, or may be provided in, any one of the following devices: a smartphone, a camera, a foldable smartphone, a foldable smartphone camera, a foldable image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick etc.), a robot or robotics device, a medical device (e.g. an endoscope, inhaler, drug dispenser, etc.), an augmented reality system or device, a virtual reality system or device, a wearable device, a drone (aerial, water, underwater, etc.), an aircraft, a spacecraft, a submersible vessel, a vehicle, an autonomous vehicle (e.g. a driverless car), a tool, a surgical tool, a display screen, and a touchscreen.

The invention has particular advantages when applied to a miniature camera, for example where the camera lens element comprises one or more lenses having a diameter of no more than 15 mm, such as in a mobile phone.

The invention is defined by the independent claims to which reference should now be made. Optional features are set forth in the dependent claims.

According to a first aspect of the present invention, there is provided a shape memory alloy apparatus comprising: a member comprising a first end portion and a second end portion; and a shape memory alloy component connected to the member and being configured to, on contraction, change the separation between the first end portion and the second end portion of the member, the member being configured to be in tension during contraction of the shape memory alloy component, wherein the said separation changes in a direction that is angled to the direction of contraction.

In other words, the member may exert an output force to change the separation between the first end portion and the second end portion of the member, wherein the output force does not align (e.g. 0° and 180°) with an input force imposed by the contraction of shape memory alloy component.

More specifically, the members are configured to react to the tension in the SMA component by being in tension themselves. As a result, when the SMA component contracts it may pull on the members and thus placing them in tension. By only placing the member in tension during contraction of the shape memory alloy component, the member, and thus the apparatus, cannot buckle. This makes the apparatus more stable. This may be achieved by arranging the member outside the shape memory alloy component such that only when the wire contracts are the members in tension. That is, the shape memory alloy component may be arranged to be outside of the area defined by the first and second portions of the member. Furthermore, during actuation the members in the scissor jack may be placed under stress, thus in a miniature actuator the members are highly susceptible to bending or buckling.

The term 'shape memory alloy (SMA) component' may refer to any element comprising SMA, preferably the SMA component comprises an SMA wire. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material.

Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA wires may be formed of any suitable shape memory alloy material, typically a nickel-titanium alloy (e.g. Nitinol), possibly also containing tertiary components such as copper. The SMA wires may have any cross-sectional profile and diameter suitable for the application. For example, the SMA wires may have a cross section diameter of 25 µm, or 30 µm, or 35 µm, capable of generating a maximum force of between 120 mN to 400 mN whilst maintaining the strain in the SMA wire within safe limits (e.g. 2-3% reduction in length over original length). Increasing the diameter of each SMA wire from 25 µm to 35 µm approximately doubles the cross-sectional area of the SMA wire and thus approximately doubles the force provided by each SMA wire.

The shape memory alloy apparatus may further comprise: a support structure, the first end portion of the member being connected to the support structure; and a moveable element, the second end portion of the member being connected to the moveable element such that the changing of the separation between the first end portion and the second end portion of the member is configured to drive movement of the moveable element relative to the support structure along a movement axis in a first direction and/or drive, in a first rotational direction, rotational movement of the moveable element about a first axis that is perpendicular to the movement axis. Contraction of the shape memory alloy component may apply force equally to the moveable element and to the support structure.

By exerting a force on a side of the movable component, at position distanced from the movement axis, the pairs of members may drive rotational movement of the moveable element in about the x axis or the y axis, that is perpendicular to the movement axis, e.g. z axis. In another words, with the ability to pivot about the x and y axes, such an arrangement may enable the moveable element to tilt in any direction angled the movement axis.

The shape memory alloy apparatus may further comprise a second member comprising a first end portion and a second end portion, the member and the second member forming a pair of members. The shape memory alloy component may be arranged between the members of the pair of members and be configured to, on contraction, change the separation between the first end portion and the second end portion of each of the members.

The pair of members may be a first pair of members and the shape memory alloy apparatus may further comprise: a second pair of members, each member of the second pair of members comprising a first end portion and a second end portion, the first portion of each member being connected to the support structure and the second portion of each member being connected to the moveable element; and a second shape memory alloy component arranged between the members of the second pair of members and being configured to, on contraction, change the separation between the first end portion and the second end portion of each of the members of the second pair of members to drive movement of the moveable element relative to the support structure along the movement axis in the first direction or in a second direction, and/or to drive, in a second rotational direction, rotational movement of the moveable element about the first axis. The second direction may be opposite to the first direction and the second rotational direction being opposite to the first rotational direction. In other words, the second pair of members may drive movement of the moveable element in the same direction (or in the same rotational direction) as the first pair of members, or in the opposite direction (or in the opposite rotational direction).

The first and second pairs of members may be arranged on opposing sides of the moveable element with respect to a plane perpendicular to the movement axis. The first shape memory alloy component may be configured to, on contraction, increase the separation between the first end portion and the second end portion of each of the members of the first pair of members, and the second shape memory alloy component may be configured to, on contraction, increase the separation between the first end portion and the second end portion of each of the members of the second pair of members. In this way, the first and second pairs of members act as an opposing pair. That is, the first and second shape memory alloy components drive, on contraction, the moveable element in opposing directions (or in opposing rotational directions). This allows for accurate adjustment of the moveable element relative to the support structure. This also advantageously enables improved compensation for heat variation over prior art systems in which contraction of different shape memory alloys all moves the moveable element in the same direction (or in the same rotational direction). In addition, this may improve bi-direction movement control in the moveable element in comparison to a system where a return biasing element is used.

Alternatively, the first and second pairs of members may be arranged on a same side of the moveable element with respect to a plane perpendicular to the movement axis. The first shape memory alloy component may be configured to, on contraction, increase the separation between the first end portion and the second end portion of each of the members of the first pair of members. The second pair of members may be arranged as an inverted arrangement to that of the first pair of members to enable movement of the moveable element in the opposing direction to the first pair of members. An inverted pair of members is a pair of members which is configured to decrease separation between the first and second arms of the members upon contraction of a shape memory alloy component arranged between the members. Therefore, the second shape memory alloy component may be configured to, on contraction, decrease the separation between the first end portion and the second end portion of each of the members of the second pair of members. Similarly to the previous arrangement, the first and second pair of members act as opposing pairs of members. The first and second shape memory alloy components, on contraction, drive movement of the moveable element in opposing directions (or in opposing rotational directions) respectively, but in this arrangement, the first and second pairs of members may be arranged on the same side of the moveable element.

In another alternative arrangement, the first and second pairs of members may be arranged on a same side of the moveable element with respect to a plane perpendicular to the movement axis, but in this arrangement, the first and second shape memory alloy components may both be configured to increase the separation of the first and second end portions of the their respective pairs of members. In this way, both the pairs of members drive movement of the moveable element in the same (first) direction. The shape memory alloy apparatus may further comprise a return or biasing mechanism, for example a spring, to return or bias the moveable element along the second direction after contraction of the shape memory alloy components and movement of the moveable element. The pairs of members may be arranged on opposite sides of the moveable element when viewed along the movement axis.

The shape memory alloy apparatus may further comprise a third pair of members and a fourth pair of members. Each member of the third and fourth pairs of members may comprise a first end portion and a second end portion, and the first end portion of each member may be connected to the support structure and the second end portion of each member may be connected to the moveable element. The shape memory alloy apparatus may further comprise third and fourth shape memory alloy components which may be arranged between the members of the third and fourth pairs of members respectively and may be configured to, on contraction, change the separation between the first end portion and the second end portion of each of the members of the third and fourth pairs of members respectively to drive movement of the moveable element relative to the support structure along the movement axis in the first and second direction respectively, or drive, in respective first and second rotational directions, rotational movement of the moveable element about the first axis. Thus, the third and fourth pair of members may act in opposition with one another, similarly to the first and second pairs of members. By providing four pairs of members in this way, two of the pairs of members act to move the moveable element in a first direction, and two of the pairs of members may act to move the moveable element in a second direction. This second direction may be the same, or opposing direction to the first direction This provides even more accurate control over the moveable element.

Each of the four pairs of members may be arranged on a respective one of four sides of the moveable element around the movement axis. In other words, when viewed along the movement axis, the four pairs of members may surround the moveable element. Opposing pairs of pairs of members (for example the first and second pairs, and the third and fourth pairs) may be arranged on adjacent sides of the moveable element.

The pairs of members in opposition compensate for temperature variation and allow the use of faster heating contraction of the shape memory alloy components to drive the moveable element in both the first and second directions, rather than relying on cooling to move the moveable element in a second direction as in the prior art. With separate control of all four pairs of members (and all four shape memory alloy components) the moveable element can be tilted. This allows for an optical image stabilisation using lens tilt, which can be used to reduce motion blur on images. The tilt control may be used in a standalone autofocusing module to compensate for static tilt assembly tolerances, which avoids the need for more expensive active alignment processes which are used to eliminate static tilt.

The pairs of members may be arranged in various ways in order to provide pairs of members acting in opposition. The first and third pairs of members may be arranged on opposing sides of the moveable element to the second and fourth pairs of members with respect to a plane perpendicular to the movement axis. In this case, the first and third shape memory alloy components may be configured to, on contraction, increase the separation between the first end portion and the second end portion of each of the members of the first and third pairs of members respectively; and the second and fourth shape memory alloy components may be configured to, on contraction, increase the separation between the first end portion and the second end portion of each of the members of the second and fourth pairs of members respectively.

Alternatively, the first, second, third, and fourth pairs of members may be arranged on a same side of the moveable element with respect to a plane perpendicular to the movement axis. In this case, the first and third shape memory alloy components may be configured to, on contraction, increase the separation between the first end portion and the second end portion of each of the members of the first and third pairs of members respectively; and the second and fourth shape memory alloy components may be configured to, on contraction, decrease the separation between the first end portion and the second end portion of each of the members of the second and fourth pair of members respectively. The first and third pairs of members may be identical to the second and fourth pairs of members and thus they operate in opposing directions. Alternatively, the first and third pairs of members may be inverted with respect to the second and fourth pairs of members, and thus they operate in the same direction.

In another alternative arrangement, the pair of members is a first pair of members and the shape memory alloy apparatus further comprises: a second pair of members, each member of the second pair of members comprising a first end portion and a second end portion, the first portion of each member being connected to the support structure and the second portion of each member being connected to the moveable element; and a second shape memory alloy component arranged between the members of the second pair of members and being configured to, on contraction, change the separation between the first end portion and the second end portion of each of the members of the second pair of members to drive, in a second rotational direction, rotational movement of the moveable element about a second axis, the second axis is perpendicular to both the first axis and the movement axis.

In the alternative embodiment, the first and second pairs of members may be arranged on adjacent sides of the moveable element with respect to a plane perpendicular to the movement axis; the first shape memory alloy component may be configured to drive rotational movement of the moveable element about a first axis that is perpendicular to the movement axis; and the second shape memory alloy component may be configured to or to drive rotational movement of the moveable element about a second axis that is perpendicular to the movement axis and the first axis. By exerting a force on a side of the movable component, at position distanced from the movement axis, the pairs of members may drive rotational movement of the moveable element in about two perpendicular axes, e.g. x axis and y axis, that are perpendicular to the movement axis, e.g. z axis. In another words, with the ability to pivot about the x and y axes, such an arrangement may enable the moveable element to tilt in any direction angled the movement axis.

The shape memory alloy apparatus may further comprise a return or biasing mechanism, for example a return spring or a flexure, to rotate the moveable element in an opposite direction after contraction of the shape memory alloy components and rotated movement of the moveable component.

Optionally, a third and forth pairs of members may be arranged on adjacent sides of the moveable element and respectively opposite to the first and second pairs of members;

a third shape memory alloy component being configured to drive rotational movement of the moveable element about the first axis and in an opposite direction to the first shape memory alloy component; and a fourth shape memory alloy component being configured to drive rotational movement of the moveable element about the second axis and in an opposite direction to the second shape memory alloy component. That is, the return spring or the flexure in the earlier example may be replaced by the third and forth shape memory alloy components so as to provide a more precise and effective control of the tilt.

Alternatively, a third and forth pairs of members may be arranged on sides of the moveable element respectively having the first and second pairs of members; a third shape memory alloy component being configured to drive rotational movement of the moveable element about the first axis and in an opposite direction to that effected by the first shape memory alloy component; and a fourth shape memory alloy component being configured to drive rotational movement of the moveable element about the second axis and in an opposite direction to that effected by the second shape memory alloy component.

An image sensor may be mounted to the support structure. The moveable element may be a lens carriage comprising at least one lens, and the lens carriage may be arranged to focus an image onto the image sensor. The movement axis may be along an optical axis of the lens element. The at least one lens may comprise a liquid lens. The combination of vertical and tilt actuation can be used to move the top surface of a liquid lens which can be used to deliver autofocus and stabilisation functions. The members may suspend the camera lens element on the support structure.

The shape memory alloy apparatus may further comprise a controller arranged to supply drive signals to the shape memory alloy components for moving the moveable element along the movement axis. For example, the controller may supply a drive signal to heat the shape memory alloy components causing them to contract, which changes the separation of the first end portion and the second end portion of the members to which the shape memory alloy components are attached, in turn moving the moveable element relative to the support structure.

According to a second aspect of the present invention, there is provided a shape memory alloy apparatus comprising: a support structure; a moveable element; a first pair of members and a second pair of members, each member comprising a first end portion and a second end portion; a first shape memory alloy component arranged between the members of the first pair of members and being configured to, on contraction, change the separation between the first end portion and the second end portion of the members of the first pair of members to drive movement of the moveable element relative to the support structure along a movement axis in a first direction and/or to drive rotational movement of the moveable element about a first axis that is perpendicular to the movement axis; and a second shape memory alloy component arranged between the members of the second pair of members and being configured to, on contraction, change the separation between the first end portion and the second end portion of the members of the second pair of members to drive movement of the moveable element relative to the support structure along the movement axis in a second direction and/or to drive rotational movement of the moveable element about a second axis, wherein the second direction being opposite to the first direction. With this arrangement, the first and second pairs of members act in opposition to move the moveable element in opposite directions upon contraction of the shape memory alloy components, or the first and second pairs of members act to rotate or title the moveable element in two different axes. The pairs of members in opposition compensate for temperature variation and allow the use of faster heating contraction of the shape memory alloy components to drive the moveable element in both the first and second directions or both rotational directions, as opposed to only be able to drive movement in a single direction or a single rotational direction upon heating and contraction.

The first and second pairs of members may be arranged on opposing sides of the moveable element with respect to a plane perpendicular to the movement axis. In this case, the first shape memory alloy component may be configured to, on contraction, increase the separation between the first end portion and the second end portion of each of the members of the first pair of members; and the second shape memory alloy component may be configured to increase the separation between the first end portion and the second end portion of each of the members of the second pair of members.

Alternatively, the first and second pairs of members may be arranged on a same side of the moveable element with respect to a plane perpendicular to the movement axis. In this case, the first shape memory alloy component may be configured to increase the separation between the first end portion and the second end portion of each of the members of the first pair of members; and the second shape memory alloy component may be configured to decrease the separation between the first end portion and the second end portion of each of the members of the second pair of members.

The shape memory alloy apparatus may further comprise a third pair of members and a fourth pair of members, each member of the third and fourth pairs of members comprising a first end portion and a second end portion. The first end portion of each member may be connected to the support structure and the second end portion of each member may be connected to the moveable element. Such connection may be effected by heat staking or by gluing. The shape memory alloy apparatus may also comprise third and fourth shape memory alloy components which may be arranged between the members of the third and fourth pairs of members respectively and may be configured to change the separation between the first end portion and the second end portion of each of the members of the third and fourth pairs of members respectively to drive movement of the moveable element relative to the support structure along the movement axis in the first and second direction respectively, or drive, in respective first and second rotational directions, rotational movement of the moveable element about the first axis.

Each pair of members is arranged on a respective one of four sides of the moveable element around the movement axis. In other words, when viewed along the movement axis, the four pairs of members may surround the moveable element. Opposing pairs of pairs of members (for example the first and second pairs, and the third and fourth pairs) may be arranged on adjacent sides of the moveable element.

The pairs of members may be arranged in various ways in order to provide pairs of members acting in opposition. For example, the first and third pairs of members may be arranged on opposing sides of the moveable element to the second and fourth pairs of members with respect to a plane perpendicular to the movement axis. The first and third shape memory alloy components may be configured to, on contraction, increase the separation between the first end portion and the second end portion of each of the members of the first and third pairs of members respectively; and the second and fourth shape memory alloy components may be configured to, on contraction, increase the separation between the first end portion and the second end portion of each of the members of the second and fourth pairs of members respectively.

Alternatively, the first, second, third, and fourth pairs of members may be arranged on a same side of the moveable element with respect to a plane perpendicular to the movement axis. The first and third shape memory alloy components may be configured to, on contraction, increase the separation between the first end portion and the second end portion of each of the members of the first and third pairs of members respectively; and the second and fourth shape memory alloy components may be configured to, on contraction, decrease the separation between the first end portion and the second end portion of each of the members of the second and fourth pair of members respectively.

In another alternative arrangement, the first and second pairs of members may be arranged on a same side of the moveable element with respect to a plane perpendicular to the movement axis, but in this arrangement, the first and second shape memory alloy components may both be configured to increase the separation of the first and second end portions of their respective pairs of members. In this way, both the pairs of members drive movement of the moveable element in the same (first) direction. The shape memory alloy apparatus may further comprise a return or biasing mechanism, for example a spring, to return or bias the moveable element along the second direction after contraction of the shape memory alloy components and movement of the moveable element. The pairs of members may be arranged on opposite sides of the moveable element when viewed along the movement axis.

In another alternative arrangement, the first and second pairs of members may be arranged on adjacent sides of the moveable element with respect to a plane perpendicular to the movement axis; the first shape memory alloy component may be configured to drive rotational movement of the moveable element about a first axis that is perpendicular to the movement axis; and the second shape memory alloy component may be configured to or to drive rotational movement of the moveable element about a second axis that is perpendicular to the movement axis and the first axis. By exerting a force on a side of the movable component at an off centre position, the pairs of members may drive rotational movement of the moveable element in about two perpendicular axes, e.g. x axis and y axis, that are perpendicular to the movement axis, e.g. z axis. In another words, with the ability to pivot about the x and y axes, such an arrangement may enable the moveable element to tilt in any direction angled to the movement axis.

The shape memory alloy apparatus may further comprise a return or biasing mechanism, for example a return spring or a flexure, to rotate the moveable element in an opposite direction after contraction of the shape memory alloy components and movement of the moveable component.

Optionally, a third and forth pairs of members may be arranged on adjacent sides of the moveable element and respectively opposite to the first and second pairs of members; a third shape memory alloy component being configured to drive rotational movement of the moveable element about the first axis and in an opposite direction to the first shape memory alloy component; and a fourth shape memory alloy component being configured to drive rotational movement of the moveable element about the second axis and in an opposite direction to the second shape memory alloy component. That is, the return spring or the flexure in the earlier example may be replaced by the third and forth shape memory alloy components so as to provide a more precise and effective control of the tilt.

Alternatively, a third and forth pairs of members may be arranged on sides of the moveable element respectively having the first and second pairs of members; a third shape memory alloy component being configured to drive rotational movement of the moveable element about the first axis and in an opposite direction to the first shape memory alloy component; and a fourth shape memory alloy component being configured to drive rotational movement of the moveable element about the second axis and in an opposite direction to the second shape memory alloy component.

In the second aspect of the invention, the members may or may not be tension-based members, i.e. members that are only placed under tension reacting to tension in the shape memory alloy component as it contracts.

An image sensor may be mounted to the support structure. The moveable element may be a lens carriage comprising at least one lens, and the lens carriage may be arranged to focus an image onto the image sensor. The movement axis may be along an optical axis of the lens element. The at least one lens may comprise a liquid lens. The members may suspend the camera lens element on the support structure.

In such arrangement, the members may provide sufficient mechanical advantage for use with a miniature camera. The mechanical advantage may be 5.5:1. A 600 μm mechanical stroke may be achieved from a 220 μm shape memory alloy component stroke. The force required to overcome deflection or deformation of the flexure members in order achieve the full stroke may be less than 20 mN.

The shape memory alloy component may be connected to the member at a position between the first end portion and the second end portion. The shape memory alloy component may be connected to the member at a midpoint between the first end portion and the second end portion.

The members may be flexures. A flexure is a flexible element configured to be compliant in specific degrees of freedom. The members or flexures may at least define V-shaped structures. The V-shaped structures may each comprise a pivot which may be at the point where the first end portion meets the second end portion. The shape memory alloy components may be connected to their respective flexures at the pivot. Optionally, the angle defined between the shape memory alloy components and the first and second end portions of their respective flexures is from 10 degrees to 45 degrees, preferably from 20 degrees to 30 degrees, more preferably from 22 degrees to 26 degrees, and most preferably 23 degrees. Alternatively, the flexures may at least define a curved shape. For example, each flexure may at least define a semi-circular shape. The members or flexures may comprise, or be made entirely from, stainless steel, spring steel, or copper alloys such as phosphor bronze which are particularly suited for lower electrical resistance. In some embodiments, the flexure is an electrical conductor for forming electrical communication between the SMA wires and electrical terminals.

The shape memory alloy components may be secured to the members by crimp portions. A crimp portion may be a crimp head attached to the member by laser welding. The members may be connected to the moveable element and the support structure by heat staking or glueing. The members may comprise folded portions which are folds out of the plane of movement of the member to transfer load and ensure that the member moves and flexes in the right place by stiffening the folded sections.

According to a third aspect of the present invention, there is provided a method of controlling a shape memory alloy apparatus, the method comprising: contracting a shape memory alloy component; placing, by contracting the shape memory alloy component, a member under tension; and changing, by placing the member under tension, the separation between a first end portion and a second end portion of the member, wherein the said separation changes in a direction that is angled to the direction of contraction. With this method, the member is only placed under tension during contraction of the shape memory alloy component and is not under tension or compression when at rest (when the shape memory alloy component is not contracted) which eliminates the possibility of the member buckling when the apparatus is at rest. The method may be a method of controlling any shape memory alloy apparatus as previously described.

The changing of separation between the first end portion and the second end portion of the member may drive movement of a moveable element relative to a support structure along a movement axis, or rotational movement about an axis perpendicular to the movement axis.

The apparatus controlled by the method may be used for one or more of: autofocusing, optical image stabilisation, zoom, and haptics.

There is also provided another method of controlling a shape memory alloy apparatus, the method comprising: contracting a first shape memory alloy component; changing the separation between a first end portion and a second end portion of a first member due to the contraction of the first shape memory alloy component to drive movement of a moveable element relative to a support structure in a first direction along a movement axis; contracting a second shape memory alloy component; and changing the separation between a first end portion and a second end portion of a second member due to the contraction of the second shape memory alloy component to drive movement of a moveable element relative to a support structure in a second direction along a movement axis, the second direction being opposite to the first direction. With this method, the moveable element can be moved in both a first and second direction by contracting a first or second shape memory alloy component respectively. Thus, this allows the use of faster heating contraction of the shape memory alloy components to drive the moveable element in both the first and second directions, as opposed to only be able to drive movement in a single direction upon heating and contraction. This method may also be used for controlling any shape memory alloy apparatus as previously described.

The movement of the moveable element may cause the moveable element to tilt about an axis perpendicular to the movement axis. An image sensor may be mounted to the support structure. The moveable element may be a lens carriage comprising at least one lens. The movement axis may be along an optical axis of the lens element. The movement of the lens carriage may provide one or both of optical image stabilisation and autofocusing of an image acquired at the image sensor. The apparatus may be used for one or more of: autofocusing, optical image stabilisation, zoom, and haptics.

According to a fourth aspect of the present invention, there is provided a method of manufacturing a shape memory alloy apparatus, the method comprising: etching at least one member onto a single sheet; assembling the single sheet comprising the at least one member into a frame; depositing the at least one member from the frame onto a surface; and securing a shape memory alloy component to the at least one member. The method of manufacture may be a method of manufacture of any shape memory alloy apparatus previously described.

BRIEF DESCRIPTION OF THE DRAWINGS

Certain embodiments of the presently-claimed invention will now be described, by way of example only, with reference to the accompanying drawings, in which:

Like features are denoted by like reference numerals.

DETAILED DESCRIPTION

Example shape memory alloy apparatuses will now be described with reference to FIGS. 1 to 6.

Figure 1:
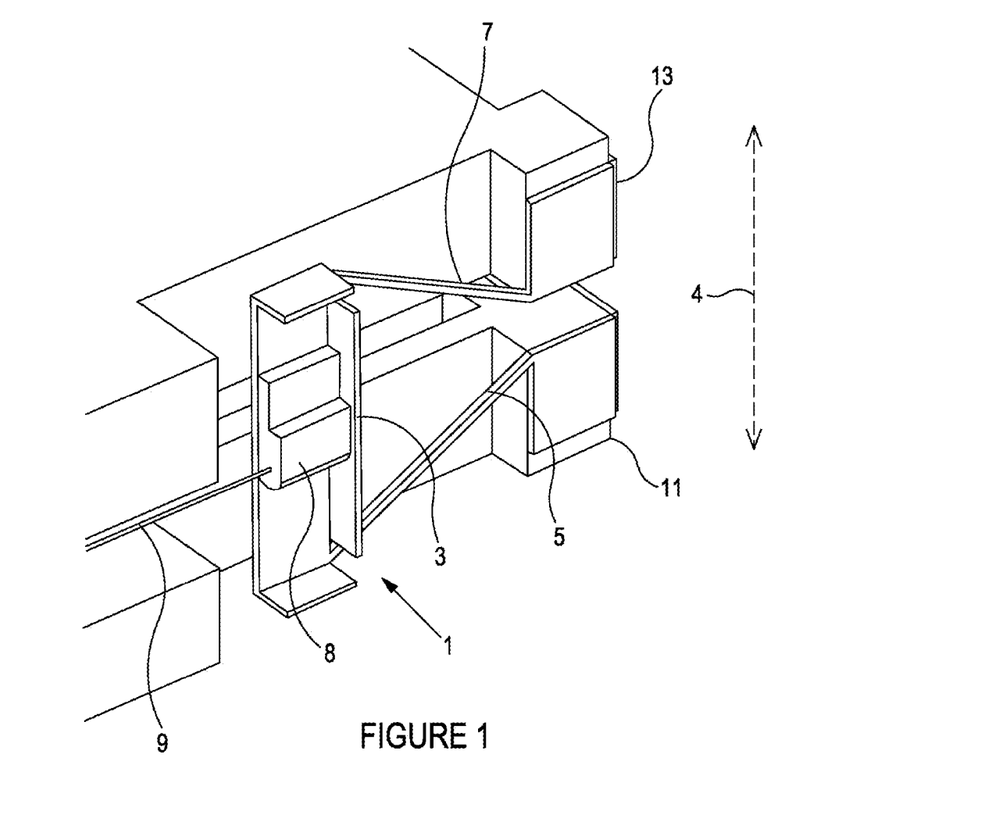
FIG. 1 is a perspective view of a shape memory alloy apparatus embodying an aspect of the present invention.

FIG. 1 illustrates a shape memory alloy apparatus 1, which comprises a member 3. The member 3 comprises a first end portion 5 and a second end portion 7. In this example, the member is a phosphor bronze flexure 3. The flexure 3 is connected to a shape memory alloy component 9 by a crimp portion 8. In this example, the SMA component is an SMA wire 9. The crimp portion 8 is a crimp head connected to the flexure 3 by, in this example, laser welding. The first end portion 5 of the flexure 3 is connected to a support structure 11. The second end portion 7 of the flexure 3 is connected to a moveable element 13. In this example, the end portions 5,7 are glued to the support structure 5 and the moveable element 13.

When at rest, the flexure 3 is not under tension. The flexure 3 is only tensioned when the SMA wire 9 is contracted. SMA material has the property that, on heating, undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus, heating of SMA component or wire 9 causes it to decrease in length.

During use, a drive signal is provided to the SMA wire 9 by a controller (not shown). The drive signal heats the SMA wire 9 and causes it to contract. This places the flexure 3 under tension. In this example, as the SMA wire 9 contracts, the flexure 3 is pulled and the separation between the first and second end portions 5, 7 is therefore increased. Due to the end portions being connected to the support structure 11 and the moveable element 13, the moveable element 13 is moved relative to the support structure 11 in a first direction along a movement axis 4.

The gearing achieved by the members depends on the angle of the first and second end portions of the member 5, 7 to the direction of motion and is shown in the following Equation 1.

$$\text{Gearing} = \frac{InitialZ - FinalZ}{SMA \text{ Stroke}} \quad \text{Equation 1}$$

where: Initial $Z = L_f \text{Sin}(\theta)$ and: Final $Z = \sqrt{\left(L_f^2 - \left(L_f \text{Cos}(\theta) + \frac{\text{Wire Stroke}}{2}\right)^2\right)}$ where θ is the exterior angle between horizontal (defined as the plane of the shape memory alloy component) and the first or second portion of the member 5, 7, and $L_f$ is the length of member 5, 7. The gear ratio does not have a linear relationship with the angle. As the angle of the member approaches horizontal, the gear ratio tends towards infinite. The angle may be between 10 degrees and 45 degrees, such as 20 degrees to 30 degrees, such as 22 degrees to 26 degrees, or 23 degrees.

Figure 2:
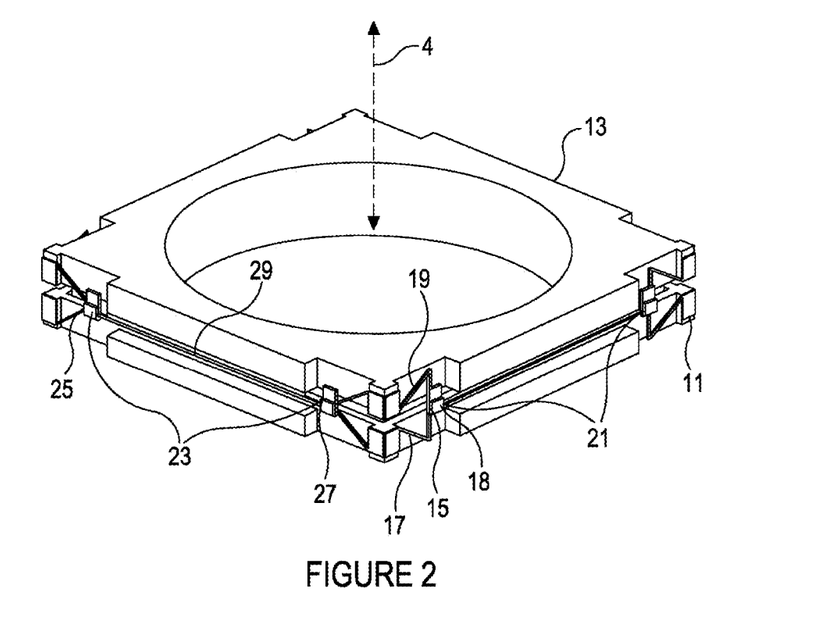
FIG. 2 is a perspective view of a shape memory alloy apparatus embodying an aspect of the present invention.

FIG. 2 illustrates the shape memory alloy apparatus 1 as in FIG. 1, but also includes a second member, which again is a flexure 15 in this example. The flexure 15 comprises a first end portion 17 and a second end portion 19. Connected to the flexure 15 is the SMA wire 9, also connected to the flexure 15 by a crimp head 18. The first end portion 17 and the second end portion 19 are heat staked to the support structure 11 and the moveable element 13 respectively. The member 3 and the second member 15 form a pair of members 21.

In use, the SMA wire 9 is contracted as above, which places both flexures 3, 15 under tension and causes the separation of the first 5, 15, and second 7, 17 end portions to increase respectively. Due to the connections with the support structure 11 and the moveable element 13, this causes the moveable element 13 to move in a first direction, which in this example is in a direction away from the support structure along the movement axis 4.

Figure 4:
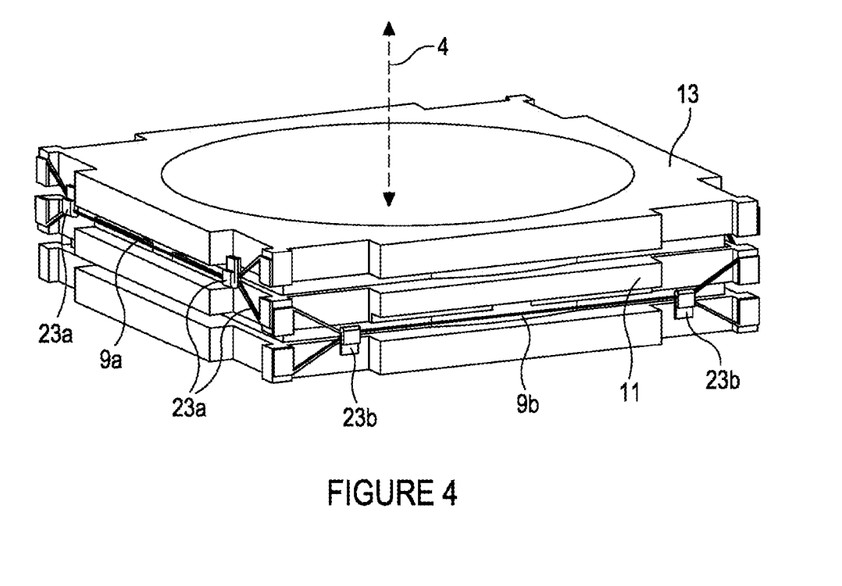
FIG. 4 is a perspective view of a shape memory alloy apparatus embodying an aspect of the present invention.

FIG. 2 also illustrates a second pair of members 23, which is similar in many ways to the pair of members 21, but significantly differs in that flexures 25, 27 are arranged such that contraction of the SMA wire 29 moves the moveable element 13 in a second direction relative to the support structure 11. The second direction is opposite to the first direction. So, in this example, the moveable element 13 moves towards the support structure 11 along the movement axis 4 by contraction of the SMA wire 29. The pair of members 21 and the second pair of members 23 therefore act to oppose one another. In this example shown in FIG. 2, the flexures 25, 27 of the pair of flexures 23 are inverted flexures to the flexures 3, 15 of the pair of flexures 21. This allows for the pairs of flexures 21, 23 to be arranged on the same side of the moveable element 13 with respect to a plane perpendicular to the movement axis 4. An alternative arrangement of the pairs of flexures is illustrated in FIG. 4 explained below. By providing opposing pairs of flexures, the moveable element may be tilted.

The embodiment as shown in FIG. 2 may also be able capable of tilting the movable element 13 about two perpendicular axes that are perpendicular to the movement axis 4, e.g. effecting rotational movement about the x-axis and the y-axis, or tilting. Taking the second pair of members 23 as an example, upon contraction of the SMA wire 29, it may move the respective side of moveable element 13 in a second direction relative to the support structure 11. Thus, if the moveable element 13 is allowed to pivot about the support structure 11, such contraction would cause the moveable element 13 to tilt towards the respective side of shape memory alloy apparatus.

In some embodiments, a return spring or flexure may be provided such that upon cooling of the SMA wires 9, 29, the return spring or flexure bias the moveable element 13 to return to its default position.

In some embodiments, the first and second pairs of the members may be placed on the same side (where the two pairs of members acts in opposing directions upon actuation of the SMA wire), or opposite side (where the two pairs of members acts in the direction upon actuation of the SMA wire) to provide bi-directional controlled movement in the moveable element 13.

Figure 3:
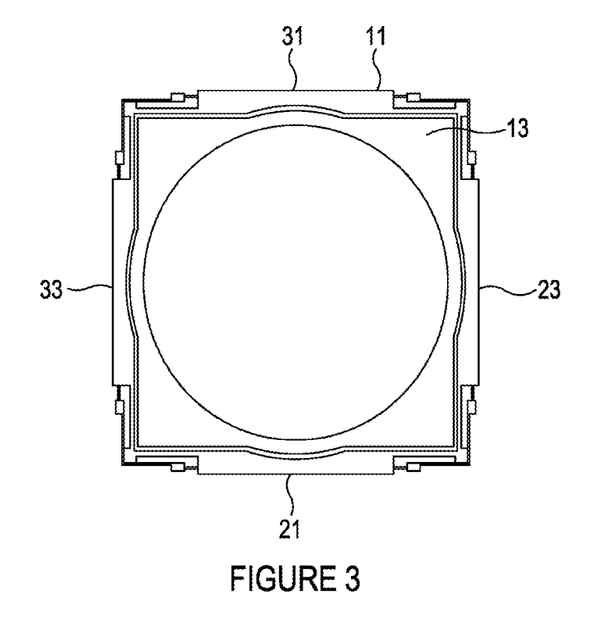
FIG. 3 is a plan-view of a shape memory alloy apparatus embodying an aspect of the present invention.

FIG. 3 illustrates a plan view of the arrangement of FIG. 2. As well as the pair of flexures 21 and the second pair of flexures 23, there is also a third pair of flexures 31 and a fourth pair of flexures 33. The third pair of flexures 31 is identical to the pair of flexures 21 in all aspects except its position on the apparatus. The third pair of flexures 31 is arranged on a side opposite to the pair of flexures 21 and on a side of the moveable element 13 perpendicular to the second pair of flexures 23 when viewed along the movement axis 4. The third pair of flexures 31 acts to drive movement of the moveable element 13 relative to the support structure 11 in the first direction. The fourth pair of flexures 33 is identical to the second pair of flexures 23 in all aspects except its position on the apparatus. The fourth pair of flexures 33 acts to drive movement of the moveable element 13 relative to the support structure 11 in the second direction. The fourth pair of flexures 33 is arranged on a side of the moveable element 13 opposite to the second pair of flexures 21 and on a side of the moveable element 13 perpendicular to the pair of flexures 21 and the third pair of flexures 31 when viewed along the movement axis 4. Thus, the four pairs of flexures 21, 23, 31, 33 are arranged on respective one of four sides of the moveable element 13 around the movement axis 4.

In use, the SMA wires arranged between each of the pairs of flexures may be individually heated and thus contracted. Therefore, the moveable element 13 may be moved both away from and towards the support structure 11, but also the moveable element 13 can be tilted, e.g. rotate about an axis perpendicular to the primary axis 4, by contracting only selected SMA wires. In this example, as in FIG. 2, the pairs of flexures are all arranged on the same side of the moveable element 13 with respect to a plane perpendicular to the movement axis 4, which is achieved by having inverted flexures and non-inverted flexures which act to oppose one another.

FIG. 4 illustrates an alternative arrangement of a shape memory alloy apparatus. In this example, the moveable element 13 is a lens carriage moveable through an aperture of the support structure 11 in a direction along the movement axis 4. Two pairs of flexures 23a, 23b are arranged on two adjacent sides of the moveable element 13 similarly to the arrangements previously described. In other embodiments, an additional pair of flexures are provided opposite of each pair of flexures 23a, 23b. In contrast to the embodiment as shown in FIG. 2, only inverted flexures pairs 23a, 23b are used. By using the same type of flexures to effect a bi-directional movement, such arrangement may advantageously simplify control, as well as force balance between the flexures.

As illustrated in FIG. 4, the inverted flexures pairs 23a, 23b are in stack arrangement. As the SMA wires contract, the separation between the end portions of the individual flexures is decreased. For example, a first flexure pair 23a are connected between an upper portion of the moveable element 13 and the support structure 11. As the SMA wire 9a contracts the flexure pair 23a pulls the moveable element 13 in a downward direction. A second flexure pair 23b are connected between a lower portion of the moveable element 13 and the support structure 11. As the SMA wire 9b contracts the flexure pair 23b pulls the moveable element 13 in an upward direction.

In some embodiments, the flexure pairs 23a, 23b may be replaced by non-inverted flexure pairs 21 as shown in FIG. 2. In such embodiments, upon actuation of the SMA wires, the first flexure pair connected between the upper portion of the moveable element may pull the moveable element in the upward direction, and the second flexure pair connected between the lower portion of the moveable element may pull the moveable element in the downward direction.

Similar to the embodiment as shown in FIG. 3, the SMA wires arranged between each of the pairs of flexures may be individually heated and thus contracted. Therefore, the moveable element 13 may be tilted, e.g. rotate about an axis perpendicular to the primary axis 4, by contracting only selected SMA wires.

Combinations of non-inverted and inverted flexures, or flexures placed on the same or opposing sides of the moveable element 13 with respect to a plane perpendicular to the movement axis 4 may be used similarly to the examples described above.

Embodiments of the present invention have been described. It will be appreciated that variations and modifications may be made to the described embodiments within the scope of the present invention. For example, arrangements, positioning, and types of the various pairs of flexures are not limited to those described above and any combination of position and type of flexures falls within the scope of the present invention.

The invention claimed is:

1. A shape memory alloy apparatus comprising:
    a member comprising a first end portion and a second end portion;
    a shape memory alloy component connected to the member and being configured to, on contraction, change the separation between the first end portion and the second end portion of the member, the member being configured to be in tension during contraction of the shape memory alloy component, wherein the said separation changes in a direction that is angled to the direction of contraction;
    a support structure, the first end portion of the member being connected to the support structure;
    a moveable element, the second end portion of the member being connected to the moveable element such that the changing of the separation between the first end portion and the second end portion of the member is configured to drive movement of the moveable element relative to the support structure along a movement axis in a first direction and/or to drive, in a first rotational direction, rotational movement of the moveable element about a first axis that is perpendicular to the movement axis; and
    a second member comprising a first end portion and a second end portion, the member and the second member forming a pair of members, the shape memory alloy component being arranged between the members of the pair of members and being configured to, on contraction, change the separation between the first end portion and the second end portion of each of the members.

2. The shape memory alloy apparatus according to claim 1, wherein the said separation changes in a direction that is substantially perpendicular to the direction of contraction.

3. The shape memory alloy apparatus according to claim 1 wherein the pair of members is a first pair of members and the shape memory alloy apparatus further comprises:
    a second pair of members, each member of the second pair of members comprising a first end portion and a second end portion, the first portion of each member being connected to the support structure and the second portion of each member being connected to the moveable element; and
    a second shape memory alloy component arranged between the members of the second pair of members and being configured to, on contraction, change the separation between the first end portion and the second end portion of each of the members of the second pair of members to drive movement of the moveable element relative to the support structure along the movement axis in the first direction or in a second direction and/or to drive, in a second rotational direction, rotational movement of the moveable element about the first axis, the second direction being opposite to the first direction and the second rotational direction being opposite to the first rotational direction.

4. The shape memory alloy apparatus according to claim 3 further comprising:
    a third pair of members and a fourth pair of members, each member of the third and fourth pairs of members comprising a first end portion and a second end portion, the first end portion of each member being connected to the support structure and the second end portion of each member being connected to the moveable element; and
    third and fourth shape memory alloy components arranged between the members of the third and fourth pairs of members respectively and being configured to, on contraction, change the separation between the first end portion and the second end portion of each of the members of the third and fourth pairs of members respectively to drive movement of the moveable element relative to the support structure along the movement axis in the first and second direction respectively, or drive, in respective first and second rotational directions, rotational movement of the moveable element about the first axis.

5. The shape memory alloy apparatus according to claim 4 wherein each pair of members is arranged on a respective one of four sides of the moveable element around the movement axis, wherein the first and third pairs of members are arranged on opposing sides of the moveable element to the second and fourth pairs of members with respect to a plane perpendicular to the movement axis, the first and third shape memory alloy components being configured to, on contraction, increase the separation between the first end portion and the second end portion of each of the members of the first and third pairs of members respectively; and the second and fourth shape memory alloy components being configured to, on contraction, increase the separation between the first end portion and the second end portion of each of the members of the second and fourth pairs of members respectively.

6. The shape memory alloy apparatus according to claim 5 wherein:
the first, second, third, and fourth pairs of members are arranged on a same side of the moveable element with respect to a plane perpendicular to the movement axis;
the first and third shape memory alloy components being configured to, on contraction, increase the separation between the first end portion and the second end portion of each of the members of the first and third pairs of members respectively; and
the second and fourth shape memory alloy components being configured to, on contraction, decrease the separation between the first end portion and the second end portion of each of the members of the second and fourth pair of members respectively.

7. The shape memory alloy apparatus according to claim 1, wherein:
an image sensor is mounted to the support structure;
the moveable element is a lens carriage comprising at least one lens; and
the movement axis is along an optical axis of the lens element.

8. The shape memory alloy apparatus according to claim 1, wherein the shape memory alloy component being connected to the member at a position between the first end portion and the second end portion.

9. The shape memory alloy apparatus according to claim 1, wherein the members are flexures, wherein the flexures at least define V-shape structures each comprising a pivot, the shape memory alloy component being connected to the pivot.

10. The shape memory alloy apparatus according to claim 9 wherein the angle defined between the shape memory alloy components and the first and second end portions of their respective flexures is from 10 degrees to 45 degrees, preferably from 20 degrees to 30 degrees, more preferably from 22 degrees to 26 degrees, and most preferably 23 degrees.

11. A shape memory alloy apparatus comprising:
a support structure;
a moveable element;
a first pair of members and a second pair of members, each member comprising a first end portion and a second end portion;
a first shape memory alloy component arranged between the members of the first pair of members and being configured to, on contraction, change the separation between the first end portion and the second end portion of the members of the first pair of members to drive movement of the moveable element relative to the support structure along a movement axis in a first direction and/or to drive, in a first rotational direction, rotational movement of the moveable element about a first axis that is perpendicular to the movement axis; and
a second shape memory alloy component arranged between the members of the second pair of members and being configured to, on contraction, change the separation between the first end portion and the second end portion of the members of the second pair of members to drive movement of the moveable element relative to the support structure along the movement axis in a second direction and/or to drive rotational movement of the moveable element about a second axis perpendicular to both first axis and the movement axis or about the first axis in a second rotational direction;
wherein the second direction being opposite to the first direction and the second rotational direction being opposite the first rotational direction.

12. The shape memory alloy apparatus according to claim 11 wherein:
the first and second pairs of members are arranged on opposing sides of the moveable element with respect to a plane perpendicular to the movement axis;
the first shape memory alloy component being configured to, on contraction, increase the separation between the first end portion and the second end portion of each of the members of the first pair of members; and
the second shape memory alloy component being configured to increase the separation between the first end portion and the second end portion of each of the members of the second pair of members.

13. The shape memory alloy apparatus according to claim 11 wherein:
the first and second pairs of members are arranged on a same side of the moveable element with respect to a plane perpendicular to the movement axis;
the first shape memory alloy component being configured to increase the separation between the first end portion and the second end portion of each of the members of the first pair of members; and
the second shape memory alloy component being configured to decrease the separation between the first end portion and the second end portion of each of the members of the second pair of members.

14. The shape memory alloy apparatus according to claim 11 further comprising:
a third pair of members and a fourth pair of members, each member of the third and fourth pairs of members comprising a first end portion and a second end portion, the first end portion of each member being connected to the support structure and the second end portion of each member being connected to the moveable element; and
third and fourth shape memory alloy components arranged between the members of the third and fourth pairs of members respectively and being configured to change the separation between the first end portion and the second end portion of each of the members of the third and fourth pairs of members respectively to drive movement of the moveable element relative to the support structure along the movement axis in the first and second direction respectively, or drive, in respective first and second rotational directions, rotational movement of the moveable element about the first axis.

15. The shape memory alloy apparatus according to claim 11 wherein:
the first and second pairs of members are arranged on adjacent sides of the moveable element with respect to a plane perpendicular to the movement axis;
the first shape memory alloy component being configured to drive rotational movement of the moveable element about a first axis that is perpendicular to the movement axis; and
the second shape memory alloy component being configured to or to drive rotational movement of the moveable element about a second axis that is perpendicular to the movement axis and the first axis.

16. The shape memory alloy apparatus according to claim 15 wherein:

a third and fourth pairs of members are arranged on adjacent sides of moveable element and respectively opposite to the first and second pairs of members;

a third shape memory alloy component being configured to drive rotational movement of the moveable element about the first axis and in an opposite direction to the first shape memory alloy component; and a fourth shape memory alloy component being configured to drive rotational movement of the moveable element about the second axis and in an opposite direction to the second shape memory alloy component.

17. The shape memory alloy apparatus according to claim 15 wherein:
   a third and fourth pairs of members are arranged on respective sides of the moveable element having the first and second pairs of members;
   a third shape memory alloy component being configured to drive rotational movement of the moveable element about the first axis and in an opposite direction to the first shape memory alloy component; and
   a fourth shape memory alloy component being configured to drive rotational movement of the moveable element about the second axis and in an opposite direction to the second shape memory alloy component.

18. A method of controlling a shape memory alloy apparatus, the method comprising:
   contracting a shape memory alloy component;
   placing, by contracting the shape memory alloy component, a member under tension;
   changing, by placing the member under tension, the separation between a first end portion and a second end portion of the member, wherein the said separation changes in a direction that is angled to the direction of contraction;
   wherein the first end portion of the member is connected to a support structure and the second end portion of the member is connected to a moveable element such that the changing of the separation between the first end portion and the second end portion of the member is configured to drive movement of the moveable element relative to the support structure along a movement axis in a first direction and/or to drive, in a first rotational direction, rotational movement of the moveable element about a first axis that is perpendicular to the movement axis; and
   wherein the member and a second member form a pair of members, the second member comprising a first end portion and a second end portion, wherein the shape memory alloy component is arranged between the members of the pair of members such that the shape memory alloy component changes the separation between the first end portion and the second end portion of each of the members.

* * * * *